Figure 1:
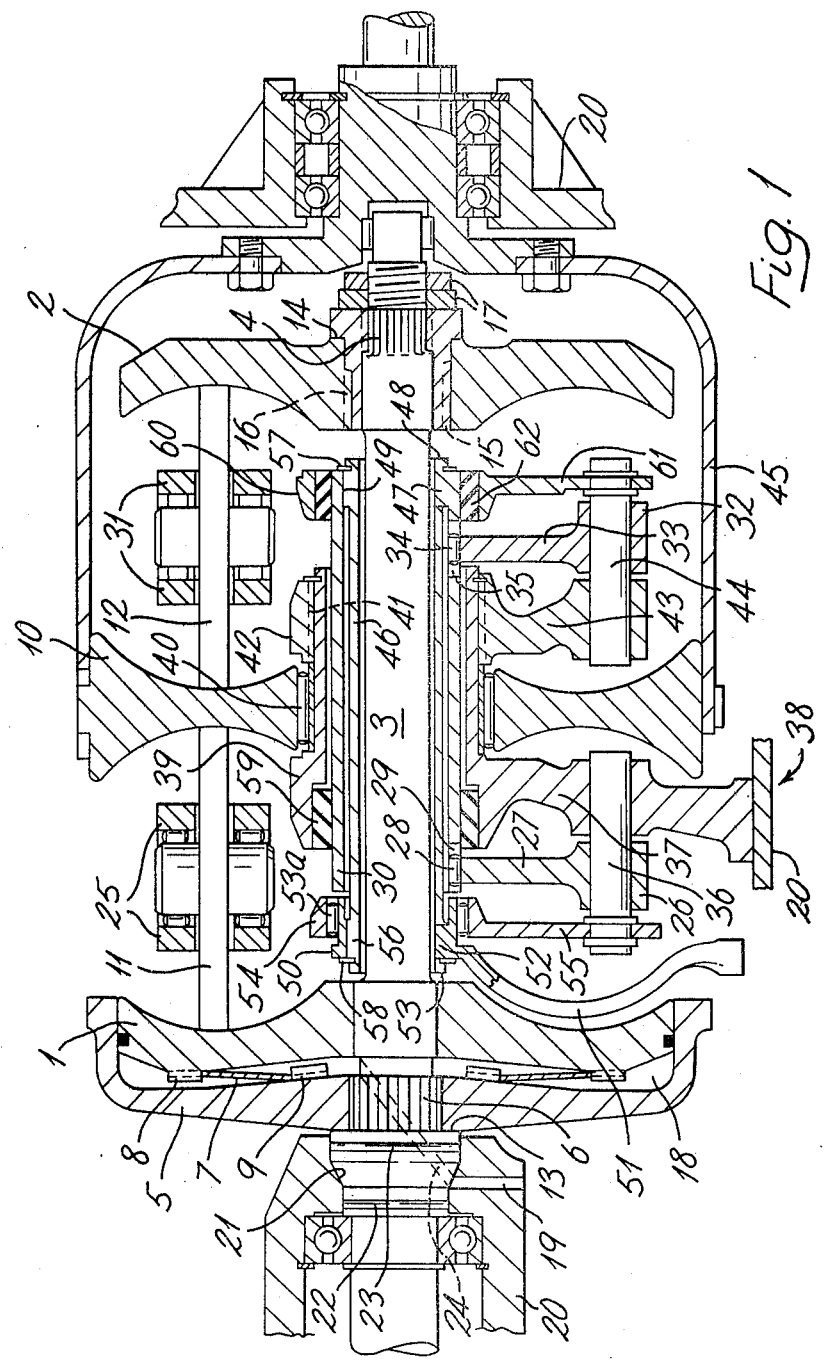

United States Patent [19]

de Brie Perry

[11] 4,257,495
[45] Mar. 24, 1981

[54] DAMPING DEVICE

[75] Inventor: Forbes G. de Brie Perry, Forest Row, England

[73] Assignee: National Research Development Corporation, London, England

[21] Appl. No.: 36,507

[22] Filed: May 7, 1979

[30] Foreign Application Priority Data

May 10, 1978 [GB] United Kingdom ............ 18703/78

[51] Int. Cl.³ .............................................. F16F 9/10
[52] U.S. Cl. ...................................... 188/1 B; 308/26
[58] Field of Search ......................... 74/574; 188/1 B; 308/26

[56] References Cited

U.S. PATENT DOCUMENTS

| 2,598,726 | 6/1952 | Stempel | 308/26 X |
| 3,101,979 | 8/1963 | Mard | 308/26 |
| 3,141,523 | 7/1964 | Dickie | 188/1 B |
| 3,306,199 | 2/1967 | Karin et al. | |
| 3,494,224 | 2/1970 | Fellows et al. | |
| 3,653,625 | 4/1972 | Plice | 188/1 B X |

FOREIGN PATENT DOCUMENTS

| 921935 | 3/1963 | United Kingdom . |
| 979062 | 1/1965 | United Kingdom . |
| 1022150 | 3/1966 | United Kingdom . |
| 1026734 | 4/1966 | United Kingdom . |
| 1130296 | 10/1968 | United Kingdom . |
| 1209322 | 10/1970 | United Kingdom . |

Primary Examiner—Duane A. Reger
Attorney, Agent, or Firm—Cushman, Darby & Cushman

[57] ABSTRACT

A device for damping both radial and axial motions of one mechanical part relative to another. The two parts may, for instance, be the fixed structure of a toroidal race variable-ratio transmission unit and the control sleeve of the unit. A flexible fluid-filled envelope fills the annular gap between one of these parts and the other, and the interior of the envelope is in the form of two volumes, one at each axial end and joined by a constriction in the middle. Relative radial motion between the two parts is damped by distortion of the envelope and consequent rotary movement of the fluid within. Relative axial motion is damped because the relative sizes of the two volumes change, and fluid moves from one volume to the other through the constriction.

12 Claims, 11 Drawing Figures

DAMPING DEVICE

This invention relates to a device for damping radial and axial motions of a generally circular member relative to a fixed casing.

According to the invention there is provided a device for damping radial and axial motions, relative to a fixed casing, of a generally circular control member, the device comprising adjacent inter-fitting surfaces, one formed on or attached to the control member and the other formed on an element restrained from radial and axial movement relative to the casing, the surfaces defining between them an annular space containing a flexible toroidal envelope filled with a viscous fluid, the axial dimension of the annular space exceeding its radial dimension, and with means for constraining the flexible envelope so that its radial dimensions at its axial ends differ from its radial dimension at one point at least intermediate those ends, on the side of the envelope adjacent to one at least of the said surfaces.

In one arrangement according to the invention the flexible envelope may have formed within it, on one of its longer internal sides, a circumferential ridge intermediate between its axial ends, such ridge approaching the opposite internal surface of the envelope, to form a constriction through which the viscous fluid is caused to flow on axial movement of the control member.

In another arrangement according to the invention the space within the flexible envelope widens radially towards its axial ends from a region intermediate between those ends. Such widening may be gradual, the profiles of the inner and outer surfaces of the envelope (as seen sectioned in a plane containing the axis) being curved. Alternatively the widening may be abrupt, from an axially extending intermediate region to slanted regions with a radial component of the profile adjacent to the axial ends of the envelope.

In this other arrangement, in either of its forms, one axial end region of the envelope is squeezed on axial motion of the control member so causing the viscous fluid to flow away from that end region towards the other end region.

In another of its aspects the invention comprises a device for damping radial and axial motions, relative to a fixed casing, of a generally circular control member, the device comprising a surface of the control member and a surface of a member restrained from radial and axial motion relative to the casing, the surfaces lying one within the other to provide an annular gap, there being contained, within the annular gap, a flexible toroidal envelope of which the axial length exceeds the radial depth, the envelope being filled with a viscous fluid, the said envelope having, on one of its axially longer internal surfaces, and in a location intermediate between the axial ends of such surface, a projection extending circumferentially around the said one surface, which projection extends radially towards the other of the axially longer internal surfaces of the envelope, whereby on relative axial movement between the control member and the restrained member the viscous fluid within the envelope is displaced axially from one end of the envelope, towards the other end, passing through the gap between the said projection and the said other axially longer internal surface of the envelope and on relative radial movement between the control member and the restrained member the said viscous fluid is displaced circumferentially around the envelope.

In yet another of its aspects the invention comprises a steplessly variable ratio toroidal race rolling traction transmission unit having two outer discs mounted on a main shaft and one intermediate disc mounted for rotation independently of the main shaft, one outer disc and one side of the intermediate disc having facing surfaces forming parts of a torus, the other outer disc and the other side of the intermediate disc having facing surfaces forming parts of a similar torus, two sets of rollers, a first set engaging the facing toroidal surfaces of, and providing a driving connection between the said one outer disc and the intermediate disc and a second set engaging the facing toroidal surfaces of the said other outer disc and the intermediate disc, the rollers each being mounted in a roller carrier which is supported by a rocker lever pivotted to a fixed part of the transmission unit, the torque reaction forces arising at the roller being supported by and applying a turning moment to the rocker lever which has a limb extending radially inwards towards the main shaft, the limbs of the rocker levers for the first set of rollers engaging points spaced apart circumferentially around a first thrust-receiving member and the limbs of the rocker levers for the second set of rollers engaging points spaced apart circumferentially around a second thrust-receiving member, the first thrust-receiving member and the second thrust-receiving member being fixed to a control sleeve which surrounds the main shaft and passes through a central aperture in the intermediate disc, the two thrust-receiving members and the control sleeve forming a common thrust-receiving assembly mounted with limited freedom of radial and axial movement relative to the rocker levers, and with means for rotating the said assembly to initiate a change of the ratio of the transmission unit by the rollers and their carriers swinging about axes substantially tangential to the centre circles of the said tori, radial motions of the first thrust-receiving member in response to unequal torque reactions of the first set of rollers causing differential ratio changes as between the rollers of the first set, tending to equalise the torque reactions of the rollers and similarly with the second thrust-receiving member and the second set of rollers, furthermore, axial motions of the common thrust-receiving assembly causing rotation in one sense of the rocker levers for the first set of rollers and in the opposite sense of the rocker levers for the second set of rollers tending to equalise the torque reactions of the two sets of rollers and with means for damping radial and axial motions of the common thrust-receiving assembly characterised in that the damping means comprises a flexible toroidal envelope filled with a viscous fluid received within an annular space bounded on one side by a cylindrical surface of the control sleeve adjacent to one, at least, of the common thrust-receiving members and on the other side by a cylindrical surface of a member restrained against radial and axial motions relative to fixed parts of the transmission unit the said envelope being longer in the axial direction of the control sleeve than its thickness radially of the control sleeve and having on one of its axially longer internal surfaces and in a location intermediate between the axial ends of such internal surface, a projection extending circumferentially around the said one surface which projection extends radially towards the other of the axially longer internal surface of the envelope whereby, on relative axial movement between the control sleeve and fixed parts of the transmission unit the viscous fluid within the envelope is displaced axially from one end of the envelope towards the other passing through the gap between the said projection and the said other axially longer internal surface of the envelope and on relative radial movement between the control sleeve and fixed parts of the transmission unit the said viscous fluid is displaced circumferentially around the interior of the envelope.

Preferably the two axially longer exterior sides of the envelope are bonded to sheath rings one of which abuts the said surface of the control member and is restrained against axial movement relative thereto, the other of which abuts the said surface of the restrained member and is also restrained from axial motion relative to the latter member at least one of the said sheath rings being free to rotate relative to that one of the said surfaces which it abuts, the bonding of the envelope to the sheath rings extending over the axially intermediate regions of the envelope.

Preferably the said internal projection in one of the axially longer internal sides of envelope is formed by a corresponding projection on the abutting sheath ring.

The said projection may be on the radially inner internal surface or the radially outer internal surface of the envelope.

The viscosity of the fluid within the said envelope will be chosen according to the degree of damping required and the nature of the vibrations to be damped.

Figure 2:
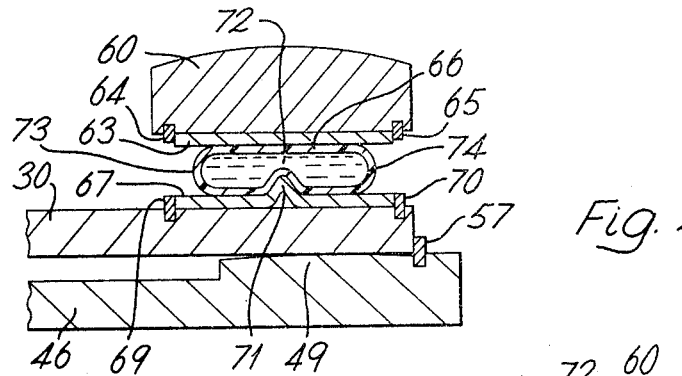
Figure 3:
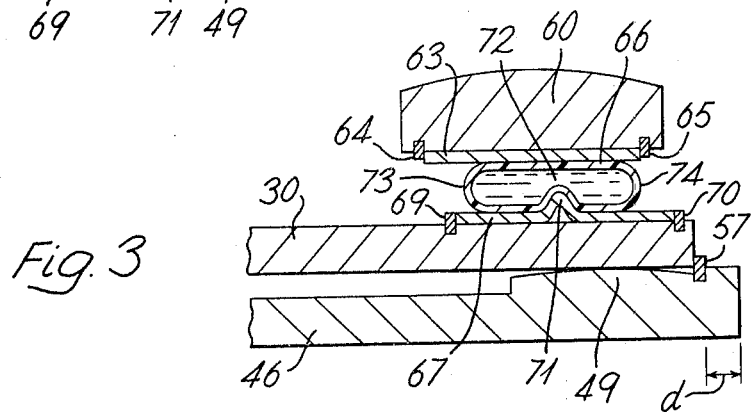
Figure 4:
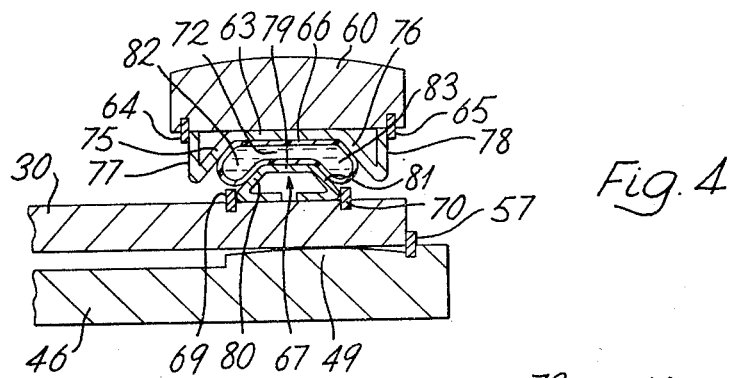
Figure 5:
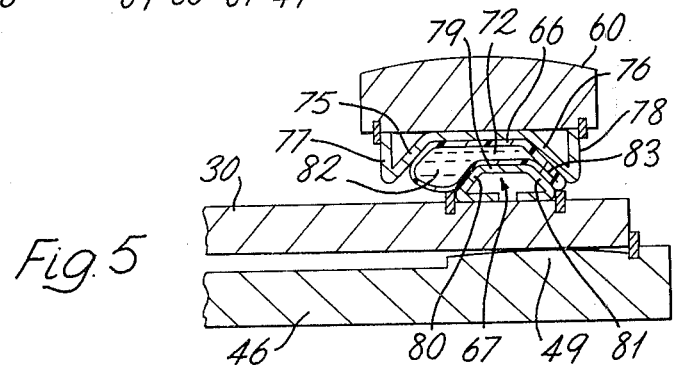
Figure 6:
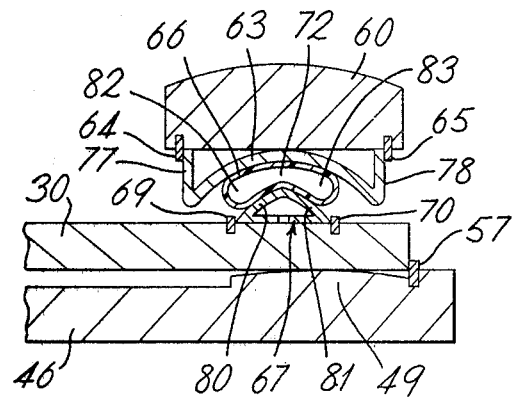
Figure 7:
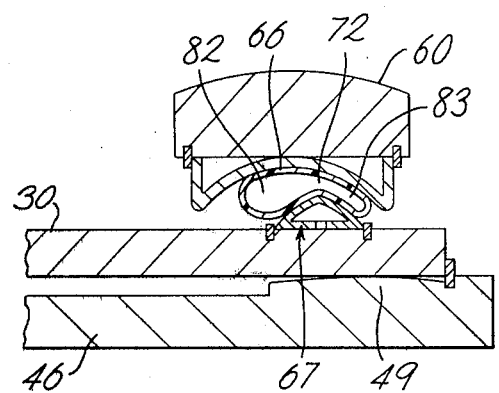
Figure 8:
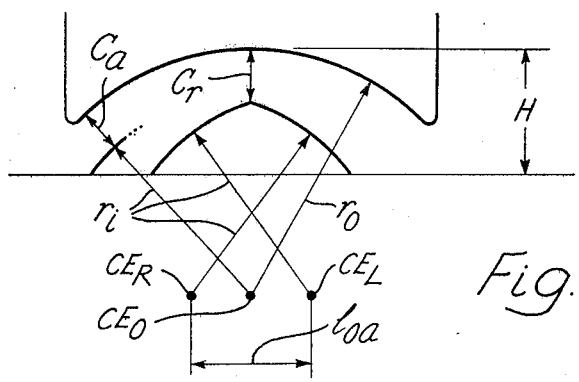
Figure 9:
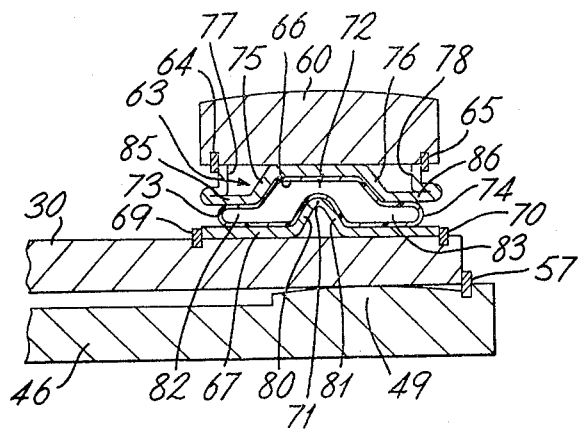
Figure 10:
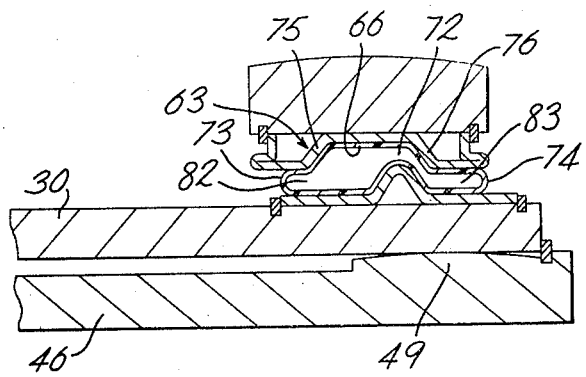
Figure 11:
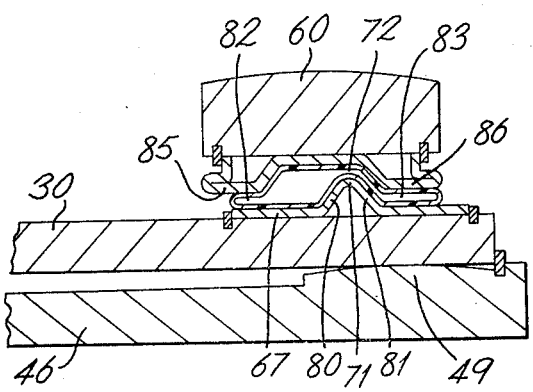

The invention will be described in relation to a steplessly variable ratio transmission unit of the so-called toroidal race rolling traction type and will be more clearly understood from the following description of certain embodiments thereof, illustrated in the accompanying drawings in which:

FIG. 1 is a longitudinal section of a toroidal race rolling traction transmission unit incorporating the invention, FIG. 2 is a longitudinal section of a part of a damper according to the invention, FIG. 3 is a longitudinal section of the damper illustrated in FIG. 2 in the attitude it adopts on axial movement of the control member, FIG. 4 is a longitudinal section of a part of another damper according to the invention, FIG. 5 is a longitudinal section of the damper illustrated in FIG. 4 in the attitude it adopts on axial movement of the control member, FIG. 6 is a longitudinal section of a part of yet another damper according to the invention, FIG. 7 is a longitudinal section of the damper illustrated in FIG. 6 in the attitude it adopts on axial movement of the control member, FIG. 8 is a diagrammatic longitudinal section of the damper of FIGS. 6 and 7, indicating some important dimensions and other parameters, FIG. 9 is a longitudinal section of a part of yet another damper according to the invention, FIG. 10 is a longitudinal section of the damper illustrated in FIG. 9 in the attitude it adopts on axial movement of the control member, and FIG. 11 is a longitudinal section of the damper shown in FIGS. 9 and 10 in the attitude it adopts on axial and radial movement of the control member.

The transmission unit illustrated in FIG. 1 comprises two input discs 1 and 2 mounted on an input shaft 3. Disc 2 is restrained from rotation relative to shaft 3 by splines 4. Disc 1 is received within a cylinder 5 which is restrained from rotation relative to shaft 3 by splines 6. A conical spring 7 bears against disc 1 and cylinder 5 urging them apart. Spring 7 has outer tongues which engage gaps in a circumferential ridge 8 on the left hand face of disc 1 and inner tongues which engage gaps in a circumferential ridge 9 on the right hand face of cylinder 5. These two sets of tongues and ridges restrain disc 1 and cylinder 5 from relative rotation and as the latter is splined (by splines 6) to shaft 3, disc 1 is also restrained from rotation relative to shaft 3.

The facing sides of discs 1 and 2 are each formed as part of a torus. Between discs 1 and 2 is an output disc 10 which is formed as part of a torus on each of its sides.

Rollers such as 11 provide a driving connection between the opposed toroidal surfaces of discs 1 and 10. Rollers such as 12 provide a driving connection between the opposed toroidal surfaces of discs 2 and 10. The two sets of rollers (such as 11 and such as 12) provide parallel drive paths from the input shaft 3 to the output disc 10.

Cylinder 5 bears against a shoulder 13 on shaft 3. Disc 2 bears against a shoulder 14 on a collar 15 and is restrained from rotation relative to collar 15 by splines 16, collar 15 being in turn restrained from rotation relative to shaft 3 by splines 4. Nuts 17 restrain collar 15 and disc 2 from axial movement rightwards along shaft 3. In assembly nuts 17 are tightened to impose a predetermined preload on spring 7 forcing the toroidal surfaces of discs 1, 10 and 2 together into driving engagement with the rollers such as 11 and 12 with a force sufficient for the transmission of light loads only. For the transmission of heavier loads a larger force urging the discs against the rollers, is provided by disc 1 acting as a piston in cylinder 5 between which there is a cylinder space 18 into which pressurised fluid is introduced through a duct 19 in the casing 20 (only parts of which are shown), leading from a pump (not shown). Duct 19 delivers into an annular space 21 between shaft 3 and the surrounding casing 20, flanked by seals 22 and 23. A passage 24, shown in dotted lines, leads from space 21 to cylinder space 18 and pressurised fluid at a pressure which is controlled by a valve system (not shown), in space 18 applies an appropriate force urging the discs 1 and 2 together upon rollers such as 11 and such as 12 and upon disc 10.

The rollers such as 11 are each supported in a roller carrier such as 25, each of these carriers being attached to rocker levers such as 26 by means of one arm (not shown), each rocker lever having another arm such as 27 extending radially inwards towards input shaft 3. The end of each arm such as 27 terminates in a bead such as 28 which rides in a slot such as 29 in one end of a control sleeve 30. Each rocker lever such as 26 is fulcrumed upon a pin such as 36, supported by an arm such as 37 of a spider member whose arms are fixed to casing 20 at their outer ends (as at 38) and the inner ends of the arms are integral with a sleeve 39 which extends through the centre of disc 10 and supports the inner race of a needle roller bearing 40 for disc 10.

The rollers such as 12 are each supported in a carrier such as 31, each of these carriers being attached to a rocker lever such as 32 by means of one arm (not shown), each rocker lever having another arm such as 33 extending radially inwards towards input shaft 3. The end of each arm such as 33 terminates in a bead such as 34 which rides in a slot such as 35 in the other end of control sleeve 30.

The right hand end of sleeve 39 terminates in splines 41 which mate with interior splines on a spider ring 42 from which integral radial spider arms such as 43 extend and at their outer ends support pins such as 44 upon which are fulcrumed the rocker levers such as 32.

As the output from disc 10 is taken by means of a bell 45, the spider arms such as 43 cannot be fixed to the casing 20 at their outer ends and the spider assembly 42, 43 is supported solely by sleeve 39.

Control sleeve 30 can float both radially and axially being held in place by the torque reaction forces applied to the slots such as 29 and 35 by the beads such as 28 and 34 of the rocker levers.

Each of the rollers such as 11 is one of a set of three each of which has a carrier such as 25 and a rocker lever such as 26 and the beads such as 28 are spaced at equal intervals around control sleeve 30. If the rollers are not all in the same ratio attitude they will apply different torque reaction loads to control sleeve 30 which will then shift laterally and the resulting different motions imparted to the rocker levers such as 26 tend to produce changes of ratio attitude on the part of the rollers so as to equalise their torque reaction loads. The geometry of such equalisation motions is fully explained in UK Patent Specification No. 979,062 and is in fact well known in the art.

The immediately preceding paragraph applies, mutatis mutandis, to rollers such as 12.

The slots 29 and 35, in control sleeve 30 are long enough to accommodate a certain amount of axial movement of sleeve 30 and these slots are slanted out of a plane containing the axis of rotation of shaft 3 the slant of slots 29 being of opposite sense to that of slots 35.

If the torque reaction forces applied to control sleeve 30 by the set of rollers such as 11 differ from those applied by the set of rollers such as 12, due to the slanting of the slots 29 and 35 the beads such as 28 and 34 apply an axial force to control sleeve 30 resulting in differential motions of rocker levers such as 26 on the one hand and rocker levers such as 32 on the other hand, the senses of these motions being such as to change differentially the ratio attitudes of rollers such as 11 and of the rollers such as 12 in senses tending to equalise the torque reactions of the two sets of rollers. Again the geometry of these equalisation motions is well known and is described in more detail in the said U.K. Specification No. 979,062.

Control sleeve 30 is rotated to produce a change in the ratio attitudes of all the rollers so as to change the overall ratio of the transmission unit. In the transmission unit illustrated in FIG. 1 rotary motions of control sleeve 30 are controlled by means of an inner sleeve 46 which surrounds shaft 3 and is separated therefrom and from control sleeve 30 by clearances sufficient to accommodate radial roller-to-roller load equalisation motions of control sleeve 30. Inner sleeve 46 is coupled to the right hand end of control sleeve 30 by means of tongues such as 47 formed on the control sleeve which extend radially inwards to engage slots such as 48 in inner sleeve 46. Tongues 47 are barrelled slightly in profile to accommodate relative rocking motions of sleeves 30 and 46 in the course of radial equalisation motions. Between slots 48, inner sleeve 46 is thickened, as seen at 49, to fill the gap between the two sleeves and the outer profile of these thickened regions is also barrelled to accommodate the said relative rocking motions.

The left hand end of inner sleeve 46 is embraced by a collar 50 which is integral with a control lever 51. Collar 50 has inwardly extending tongues such as 52 (which may also be barrelled as tongues 47) which engage slots such as 53 in sleeve 46. Collar 50 is supported for rotation in needle roller bearings 53a within a spider ring 54 which has integral spider arms such as 55, the outer ends of which are threaded over pivot pins such as 36. The left hand end of inner sleeve 46 is thickened, as at 56, between slots such as 53, to make contact with the inner surface of spider ring 54 and is thus restrained from radial motion which might otherwise arise from rotational forces applied via lever 51.

The thickened regions such as 56 may also be barrelled as with the thickened regions such as 49 at the other end of inner sleeve 46.

Inner sleeve 46 and control sleeve 30 are restrained from relative axial motion by a spring ring 57 and inner sleeve 46 and collar 50 are similarly restrained from relative axial motion by a spring ring 58, so that when control sleeve 30 shifts axially in the course of load equalisation action between the two sets of rollers, the whole assembly of control sleeve 30, inner sleeve 46, collar 50 and lever 51 move axially as one, the outer surface of collar 50, which engages the needle rollers such as 53, being wide enough in the axial direction to accommodate such motion.

Inner sleeve 46 by reason of the barrelling of tongues 47 and 52, can cant in any radial direction when the right hand end of control sleeve 30 shifts radially in the course of load equalisation between the rollers such as 12. The left hand end of control sleeve is also free to shift radially in the course of load equalisation between the rollers such as 11.

There is a tendency for oscillation in radial directions of the ends of control sleeve 30 and for axial oscillation also of control sleeve 30.

This tendency towards oscillatory behaviour on the part of control sleeve 30 is explained more fully in U.K Patent Specification No. 1,026,734 where methods are proposed for damping the radial and axial oscillatory motions by means of fluid filled dashpots.

The present invention provides an improved method of damping the oscillatory motions in question.

The main spider sleeve 39 is enlarged internally at its left hand end so as to leave an annular gap to receive a damper according to the invention, this damper being indicated diagrammatically at 59.

The right hand end of control sleeve is surrounded by a spider ring 60 which has integral radially outwardly extending spider arms such as 61, the outer ends being supported on the outer ends of the rocker lever fulcrum pins such as 44. The annular space between control sleeve 30 and spider ring 60 accommodates another damper 62 similar to damper 59.

U.K. Patent Specification No. 1,209,322 describes a toroidal race rolling traction transmission unit having a single set of rollers providing a driving connection between two toroidal disc faces. Load equalisation between individual rollers is achieved by radial motions of a control sleeve similar to control sleeve 30 of FIG. 1 but as there is only a single set of rollers there is no need for axial motion of the control sleeve.

A damper is described in the said U.K. Patent Specification No. 1,209,322 which occupies an annular space between the control sleeve and a surrounding part which is restrained from radial motion relative to the transmission unit casing. This damper comprises a flexible toroidal envelope filled with a viscous fluid. When the control sleeve makes a radial movement for load equalisation between the rollers, the envelope is squeezed on one side and the fluid within it is circumferentially displaced around the envelope thus absorbing energy and providing damping of radial movements of the control sleeve. Such a damper, as described in the said specification, is unable to cater for axial motions of the control sleeve; much less could it damp such motions.

The present invention consists of an adaptation of a damper of the type described in the said prior patent specification to enable it to cater for axial motions of the control sleeve and for damping such motions as well as radial motions of the control sleeve.

Various forms of damper according to the invention will now be described in relation to FIGS. 2 to 11 which show, to an enlarged scale, part of the damper 62 of FIG. 1, in four different forms. In all these drawings (FIGS. 2 to 11) the reference numerals used in FIG. 1 are again used to denote corresponding items and the said drawings show a section, in a plane containing the main axis (of shaft 3, FIG. 1) of the upper half of damper 62, and its immediate surroundings.

In FIG. 2 a cylindrical outer sheath ring 63 is a running fit within the inner cylindrical surface of spider ring 60 and is restrained from axial movement relative to ring 60 by spring clips 64 and 65 received in grooves in ring 60. A toroidal envelope 66 is bonded, over part of the central region of its outer axial side, to sheath ring 63, and is likewise bonded, over part of its inner axial side, to an inner sheath ring 67 which is a running fit over control sleeve 30 and is restrained from axial motion relative to sleeve 30 by spring clips 69 and 70 which are received in grooves in sleeve 30.

A radially outwardly extending ridge 71 is formed in the middle of inner ring 67 and extends around the full circumference of the ring. The relative diameters of outer sheath ring 63 and inner sheath ring 67 are such that envelope 66 is considerably flattened in cross section, in the radial direction and its inner axial side conforms to ridge 71 of sheath ring 67 so that its interior surface protrudes towards its outer axial side in the region of ridge 71, to form a constriction 72. The bonding of the inner axial side of envelope 66, to inner sheath ring 67 extends over ridge 71 and axially beyond the ridge for some distance short of the full axial length of envelope 66.

The axial ends 73 and 74 of envelope 66 are unrestrained and each takes up a substantially semi-circular cross-sectional form. The envelope is filled with a viscous fluid indicated by broken lines.

FIG. 3 shows the damper of FIG. 2 with sleeves 30 and 46 moved to the right relative to ring 60. It will be seen that envelope 66 has rolled bodily to the right and, if ends 73 and 74 are regarded as being equivalent to wheels, it is evident that this movement, relative to ring 60, covers half the distance d over which sleeves 30 and 46 have moved.

Ridge 71 has moved the full distance d relative to ring 60 but, owing to the bodily movement of the envelope, has only moved half the distance d relative to the envelope. However ridge 71 is now nearer to end 74 and further from end 73 respectively by ½d and in the process fluid has been displaced from the diminished space to the right of ridge 71, through constriction 72, into the enlarged space to the left of ridge 71. The energy absorbed by this flow of viscous fluid through constriction 71 damps the axial motion of control sleeve 30. It will be apparent from FIGS. 2 and 3 that a corresponding process takes place when sleeves 30 and 46 move to the left from the positions shown in FIG. 2 and it is not considered necessary to illustrate such leftward motion in a further drawing.

It must be remembered that the damper must also damp radial motions of control sleeve 30, by displacing fluid circumferentially round the envelope from zones in which sleeve 30 radially approaches ring 60 to zones where sleeve 30 recedes radially from ring 60. The radial width of the constriction region 72 must be sufficient to permit such radial movements of control sleeve 30 which, fortunately, are small compared with the axial motions.

The damper of FIGS. 2 and 3 is capable of accommodating relatively large axial motions of sleeve 30 but the damping action is reduced by the bodily axial motions of envelope 66 which reduce the motion of ridge 71 relative to the envelope to half the axial motions which are to be damped.

Envelope 66 is bonded by any convenient means to sheath ring 63 over a central region so as to leave the ends free to roll without dragging at the margins of the bonded regions; it is also bonded to sheath ring 67 over the extent of ridge 71 and a certain distance to either side of the ridge but again so as to leave the ends free to roll without dragging at the margins of the bonded regions.

FIGS. 4 and 5 show a damper having a more powerful damping action at the expense of some limitation of the extent of axial motion of control sleeve 30 which can be accommodated.

It assists the understanding of FIGS. 4 and 5 to consider means by which the bodily rolling of envelope 66 and the consequent diminution of the effect of the movement of ridge 71, in FIGS. 2 and 3 could be prevented, for instance by providing radially extending walls from ring 60. This would impede the movement of the ends 73 and 74, on axial motion of control sleeve 30 but as there would have to be a gap between such walls and the surface of sleeve 30 to accommodate radial motions of sleeve 30, a fold of the envelope 66 would be carried through one of these gaps and this fold would be subjected to severe stresses leading to early rupture of the envelope.

If it were possible to provide a circumferential groove in sleeve 30, near to the inner end of each of the said walls, the fold of the envelope could roll into this groove without damage and the effect of the bodily rolling of envelope 66 in the arrangement of FIGS. 2 and 3 would be diminished. However such a groove would weaken sleeve 30 which has to be relatively thin to fit into the limited radial space available. The alternative would be to move the position of the central part of envelope 66 radially away from sleeve 30. This, in one sense, is what is done in the arrangements of FIGS. 3 and 4.

The sheath ring 63, in FIG. 4, is provided with end walls 75 and 76 which slant away from one another and extend inwards towards control sleeve 30 and are then folded back in radially outward directions at 77 and 78 to engage the spring rings 64 and 65 which restrain sheath ring 63 from axial movement relative to spider ring 60.

Sheath ring 67 takes the form, in cross section, of a trapezium having a central part 79 parallel to and spaced away from the outer surface of control sleeve 30 and two side parts 80 and 81 extending from part 79 and slanting away from one another towards sleeve 30, the ends being bent inwards parallel to part 79 and a running fit over sleeve 30. Spring rings 69 and 70 prevent sheath ring 67 from moving axially in relation to sleeve 30. Side parts 80 and 81 are substantially parallel to and spaced away from the slanting surfaces of end walls 75 and 76 of sheath ring 63 the spacing being somewhat greater than the maximum axial movement of sleeve 30, from a central position in either direction respectively, which is to be catered for.

The space, in the radial direction, between the central part of sheath ring 63 and the central part 79 of sheath ring 67 is comparable with the distance between the crest of ridge 71 and the surface of sheath ring 63, in FIGS. 2 and 3.

The envelope 66, when fitted into the space between sheath rings 63 and 67, has a central section 72 and two end sections 82 and 83 which slant radially towards sleeve 30 and divergently.

FIG. 5 shows the state of affairs when control sleeve 30 moves to the right to the maximum extent to be accommodated. End section 83 is squeezed between the slanting surfaces of part 76 of sheath ring 63 and part 80 of sheath ring 67 expelling fluid from this end of envelope 66, via the somewhat constricted zone 72 between part 79 of sheath ring 67, and the immediately opposite part of the central part of sheath ring 63, and into the other end 82 of envelope 66 which has been enlarged by the axial separation of the slanting part 75 of sheath ring 63 and the slanting part 81 of sheath ring 67. Thus significantly more of the viscous fluid within envelope 66 will be driven through the constricted zone 72 in unit time than is the case in the arrangement of FIGS. 2 and 3 assuming the same axial velocity of control sleeve 30 in both cases.

There is however a very positive limit to the permissible axial excursion of control sleeve 30 because, in the extreme axial excursion there must still be enough clearance between the slanting surfaces 76 and 80 to accommodate the full radial excursion of sleeve 30 which is to be accommodated. This appears not to be the case in FIG. 5 but it must be noted that the skin thickness of envelope 66 has been somewhat exaggerated in the drawing, for the sake of clarity. To increase the axial travel of sleeve 30, which can be accommodated, sheath ring 63 must be widened or sheath ring 67 narrowed, in the axial direction. The former may present difficulties in view of the congested nature of the space in the vicinity of ring 60. If sheath ring 67 is narrowed however some of the advantage of the elongation, in the direction of the flow of the viscous fluid, of the constriction 72, as compared with the arrangement of FIGS. 2, and 3, is lost.

As the overall diameter of sheath ring 67 is larger than the internal diameter of the end walls 75, 77 and 76, 78 of sheath ring 63 one of them, preferably the outer ring 63, has to be split, preferably across its width (i.e. axially of ring 60) to enable sheath ring 67 to be assembled within sheath ring 63.

One method of making envelope 66 in quantity is to fill continuous tubing with viscous fluid and then to seal it and cut it at intervals of approximately the circumference of the gap between the two sheath rings allowing a little more or less as found in practice to give the correct installation packing. The ends of these lengths of envelope are brought together to form a circle which is then inserted into the said gap.

Envelope 66 is bonded to sheath rings 63 and 67, in any convenient manner, preferably only along the sections of the two sheath rings which are parallel to the outer surface of control sleeve 30, so as to leave the envelope, at the end away from which control sleeve 30 is moving, (82 in FIG. 5), free to assume a natural expanded shape.

FIGS. 6, 7 and 8 show a variant of the arrangement of FIGS. 4 and 5 in which the facing surfaces of sheath rings 63 and 67 are arcuate rather than angular.

The cross-sectional profile of sheath ring 63, except for the planar annular side sections 77 and 78, forms an arc of a circle of radius $r_o$ and centre $CE_o$ (see FIG. 8) and the cross-sectional profile of sheath ring 67, apart from the inturned parts which make contact with the outer surface of control sleeve 30, forms two intersecting arcs of radius $r_i$, being equal to $r_o$-$C_a$, $C_a$ being the clearance necessary to accommodate the envelope with adequate clearance to accommodate radial motion of control sleeve 30 when it is moved axially to the full extent required for load equalisation between the two sets of rollers. The two arcuate sections of sheath ring 67 are formed with radius $r_i$ but with centres $CE_R$ and $CE_L$ each displaced to one side of $CE_o$ by the full amount of the permissible axial excursion of control sleeve 30 on either side of a central position as shown in FIG. 6. The apex where the two arcuate sections meet must not be nearer than $C_r$ from the centre of the arcuate portion of sheath ring 63, $C_r$ being the minimum clearance necessary to accommodate radial motion of control sleeve 30. As the centres $CE_R$ and $CE_L$ are moved further from $CE_o$ to accommodate increased axial excursions of control sleeve 30, a point is reached when the curves intersect at a point exactly $C_r$ from sheath ring 63. To separate $CE_R$ and $CE_L$ more than this increases the centre clearance to a distance more than $C_R$ so that the constriction 72 becomes less effective.

The behaviour of the arrangement of FIGS. 6, 7 and 8 is apparent from the drawings in which the reference numerals used in FIGS. 2 to 5 have been repeated for equivalent items.

It will be apparent also that the clearance between the apex of the two curved sections 80 and 81 of sheath ring 67 and the adjacent surface of sheath ring 63 has been reduced slightly on movement of control sleeve 30 to the right to the position shown in FIG. 7, due to the curvature of sheath ring 63, and allowance must be made for this in the determination of $C_r$. The maximum overall axial excursion of sleeve 30 is denoted in FIG. 8 by $I_{oa}$.

As compared with the arrangement of FIGS. 4 and 5, the arrangement of FIGS. 6, 7 and 8 has shortened constriction 72 considerably but has lengthened the regions 82 and 83 of envelope 66 which are squeezed between adjacent surfaces of sheath rings 63 and 67 when control sleeve 30 moves axially so that, for a given axial displacement of control sleeve 30, a larger amount of viscous fluid within envelope 66 is displaced through the constriction 72, which compensates for the axial shortening of the latter.

Again envelope 66 is bonded to sheath rings 63 and 67 over its axially central regions, but the bonding must not extend so far as to interfere with the adoption of a natural extended shape to the end (82 in FIG. 7) of the envelope from which the control sleeve 30 has moved sheath ring 67.

FIGS. 9, 10 and 11 show an alternative method of overcoming the shortcomings of the embodiment of FIGS. 2 and 3, the reference numerals used in FIGS. 2 to 8 being used in FIGS. 9, 10 and 11, for equivalent items.

As with the arrangement of FIG. 2, the arrangement of FIGS. 9, 10 and 11 has a sheath ring 63 which stands away from spider ring 60 at its axially outer ends to form slanting walls 75, 76 but the ring 63 continues outwardly at both its axial ends with portions 85, 86 standing away from spider ring 60 and parallel to control sleeve 30; the outer ends of sheath ring 63 are folded back on themselves and then bent into the radial plane to form checks 77, 78 which are engaged by spring clips 64 and 65.

The slanting walls 75, 76 co-operate with similarly slanting walls 80, 81 on sheath ring 67 in the same way as is described in relation to FIGS. 4 and 5 for corresponding items, and walls 75 and 76 act partially to constrain the end folds 73, 74 of envelope 66, in the embodiment shown in FIG. 2, from rolling with sheath ring 67 and reducing the movement of ridge 71 in relation to the envelope as a whole.

In the arrangement of FIGS. 9, 10 and 11, however, the envelope extends into the annular zones 82, 83 formed by portions 85 and 86 of sheath ring 63, these annular zones being reduced in radial depth to the maximum extent compatible with satisfactory conditions for the envelope. Ends folds 73 and 74, as compared with FIG. 2, are likewise of greatly reduced radial depth and contain less of the filling fluid, so that the rolling of the envelope in the axially outer regions 82, 83 has a less deleterious effect on axial damping performance than is the case with the arrangement of FIGS. 2 and 3. Furthermore the zones 82 and 83 contribute to radial damping performance rendering the arrangement of FIGS. 9, 10 and 11 superior to the arrangements of FIGS. 4 and 5, and 6, 7 and 8 in this respect.

FIG. 10 shows the positions of the parts when control sleeve 30 moves to the right but remains central radially. It will be seen that envelope fold 74 has rolled rightwards so as to be level with the right hand edge of sheath ring 63 while fold 73 has receded from the left hand edge of ring 63 but has become level with the left hand edge of sheath ring 67. It will also be observed that, in the central position shown in FIG. 9, the folds 73 and 74 must each stop short of the outer edges of sheath rings 63 and 67 by half the total axial excursion of control sleeve 30 which is to be accommodated; likewise the bonding of envelope 66 to sheath rings 63 and 67 must stop short of the end folds 73, 74 by the same amount, in the central relative positions of the parts as shown in FIG. 9.

FIG. 11 shows the relative positions of the parts with control sleeve moved to the right and also moved radially, in both respects to the maximum degree which is to be accommodated. In these circumstances the zones 82 and 83 should not be closed entirely so as to bring the facing inside surfaces of the envelope 66 into contact, because this might give rise to excessive friction and would impose extremely rigorous rolling conditions upon the folds 73, 74, on axial movement of control sleeve 30, which would tend to shorten the life of envelope 66 unduly.

The arrangements illustrated in FIGS. 2 to 11 all have the sheath ring 63 adjacent to spider ring 60 and the sheath ring 67 adjacent to control sleeve 30. The positions of the sheath rings could be interchanged with sheath ring 63 lying adjacent to control sleeve 30 and with sheath ring 67 adjacent to spider ring 60, without impairing the damping action of the device. With this interchange of positions, ridge 71 in FIGS. 2 and 3 would project radially inwards from the inner surface of sheath ring 67 and the inwardly extending side pieces 75, 77 and 76, 78 in FIGS. 4 and 5 would extend outwardly whilst sheath ring 63 would taper radially inwardly instead of outwardly. Similarly, in FIGS. 6, 7 and 8 the concave face of sheath ring 63 would be on the outer surface of the ring instead of the inner surface and the convex surfaces of sheath ring 67 would be on the inner surface of the ring instead of the outer surface.

The damper 59 (FIG. 1) is similar to the damper 62, various types of which have been described in relation to FIGS. 2 to 11 inclusive, the spider sleeve 39 taking the place of spider ring 60 in those Figures.

I claim:

1. Apparatus including a fixed casing, a generally circular control member within said fixed casing, and a device for damping radial and axial motions of said control member, said device comprising:
    a first surface associated with said control member;
    an element restrained from radial and axial movement relative to said fixed casing;
    a second surface associated with said element;
    said first and second surfaces defining between them an annular space, the axial dimension of which exceeds the radial distance between said surfaces;
    a flexible toroidal envelope located within said space and filled with a viscous fluid, and
    means for constraining said flexible envelope when so located so that the cross-section said envelope presents to the flow of the fluid within said envelope from one axial end thereof to the other is relatively great in the vicinity of the two axial ends but is less at at least one point intermediate to those ends.

2. Apparatus including a fixed casing, a generally circular control member within said fixed casing, and a device for damping radial and axial motions of said control member, said device comprising:
    a first surface of said control member;
    a member restrained from radial and axial motion relative to said casing; a second surface of said restained member; an annular gap defined by said first and second surfaces, one of which said surfaces lies radially within the other; a flexible toroidal envelope filled with a viscous fluid and lying within said annular gap, said envelope being arranged whereby on relative radial movement between said control member and said restrained member said viscous fluid is displaced circumferentially around said envelope; a projection extending circumferentially around a first of two axially-longer internal faces of said envelope, and in a location intermediate the axial ends of a first of said faces; said projection extending radially towards a second of said axially-longer internal faces of said envelope, whereby on relative axial movement between said control member and said restrained member said viscous fluid within said envelope is displaced axially from one axial end of said envelope towards the opposite axial end, passing through the gap between said projection and said second axially-longer internal face of said envelope.

3. A steplessly-variable-ratio toroidal race rolling traction transmission unit comprising a sleeve member capable of rotary and axial movement whereby to control the ratio and torque characteristics of said unit, and two thrust-receiving members each fixed to said sleeve, and having means for damping radial and axial motions of the assembly of said sleeve and said members, in which said damping means comprise:

a first cylindrical surface presented by said sleeve adjacent to at least one of said thrust-receiving members;

a restrained member restrained against radial and axial motions relative to the fixed parts of said unit;

a second cylindrical surface presented by said restrained member;

an annular space bonded on opposite sides by said first and second cylindrical surfaces;

within said annular space a flexible toroidal envelope filled with a viscous fluid, said envelope being longer in the axial direction of said sleeve than its thickness radially of said sleeve, and presenting first and second axially-longer internal faces;

a projection formed on said first axially-longer internal face, said projection being at a location intermediate the axial ends of said first face, extending circumferentially around said first face and radially towards said second axially-longer internal face, whereby on relative axial movement between said sleeve and said fixed parts of said transmission unit said viscous fluid within said envelope is displaced axially from one axial end of said envelope towards the other axial end, passing through the gap between said projection and said second axially-longer internal face of said envelope, and whereby on relative radial movement between said sleeve and said fixed parts of said transmission unit said viscous fluid is displaced circumferentially around the interior of said envelope.

4. A device as claimed in claim 1 in which the flexible envelope has formed within it, on one of its axially longer internal sides, a circumferential ridge intermediate between its axial ends, such ridge approaching the opposite internal surface of the envelope to form a constriction through which the viscous fluid is caused to flow on axial movement of the control member.

5. A device as claimed in claim 1 in which the space within the flexible envelope widens radially towards its axial ends from a region intermediate between those ends.

6. A device as claimed in claim 5 in which the said widening is gradual, the profiles of the inner and outer surfaces of the envelope, as seen sectioned in a plane containing the axis, being curved.

7. A device as claimed in claim 5 in which the said widening is abrupt, from an axially extending intermediate region to slanted regions where the profiles of the radially inner and outer surfaces of the envelope, as seen sectioned in a plane containing the axis, have a radial component adjacent to each axial end of the envelope.

8. A device as claimed in claim 1 in which the two axially longer exterior sides of the envelope are bonded respectively to sheath rings one of which abuts the said surface of the control member and is restrained against axial movement relative thereto and the other of which abuts the said surface of the restrained member and is also restrained from axial motion relative to the latter member, at least one of the said sheaths being free to rotate relative to that one of the said surface which it abuts, the bonding of the envelope to each of the sheath rings extending over the axially intermediate regions of one of the said sides of the envelope.

9. A device as claimed in claim 2 in which the profile of each of the two longer sides of the envelope, as seen sectioned in a plane containing the axis, is formed by a rigid sheath ring bonded to the envelope over an axially intermediate region of the exterior of the envelope.

10. A device as claimed in claim 4 in which the other of the axially longer internal sides of the envelope is constrained, in the regions of its axial ends respectively, so that the radial depth of the space within the envelope, in those regions, is less than the radial depth of such space adjacent to those regions.

11. A device as claimed in claim 2 in which the said projection is on the radially outer side of the envelope.

12. A device as claimed in claim 8 in which the sheath ring which presents a concave profile to the other sheath ring as seen sectioned in a plane containing the axis, is split in plane substantially normal to the said axis, into two parts in a location intermediate between its axial ends, to facilitate assembly of the device.

* * * * *